United States Patent
BS et al.

(10) Patent No.: US 11,308,504 B2
(45) Date of Patent: *Apr. 19, 2022

(54) PRODUCT TEST ORCHESTRATION

(71) Applicant: Accenture Global Solutions Limited, Dublin (IE)

(72) Inventors: Vijaya Krishna BS, Bangalore (IN); Sunilkumar Gogula, Bangalore (IN); Ashok K. Muthusamy, Salem (IN); Sadanand Kapali, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 16/863,720

(22) Filed: Apr. 30, 2020

(65) Prior Publication Data

US 2020/0258102 A1 Aug. 13, 2020

Related U.S. Application Data

(63) Continuation of application No. 15/248,286, filed on Aug. 26, 2016, now Pat. No. 10,672,013.

(30) Foreign Application Priority Data

Jul. 14, 2016 (IN) .............................. 201641024090

(51) Int. Cl.
*G06Q 10/06* (2012.01)
*G06Q 30/02* (2012.01)
(Continued)

(52) U.S. Cl.
CPC ....... *G06Q 30/0201* (2013.01); *G06F 11/368* (2013.01); *G06F 11/3664* (2013.01)

(58) Field of Classification Search
CPC ........ G06Q 10/06; G06Q 30/02; G06F 11/34; G06F 11/36
(Continued)

(56) References Cited

U.S. PATENT DOCUMENTS 7,889,663 B1 * 2/2011 Wright .................. H04W 24/06
370/241
8,185,877 B1 * 5/2012 Colcord .............. G06F 11/3692
717/127
(Continued)

FOREIGN PATENT DOCUMENTS

GB 2516986 2/2015

OTHER PUBLICATIONS

Keolabs, Oct. 15, 2012, "Rob5x laboratory test automation platform", 4 pages, keolabs.com, [online] <http://www.keolabs.com/automation.html>.

*Primary Examiner* — Nga B Nguyen
(74) *Attorney, Agent, or Firm* — Mannava & Kang, P.C.

(57) ABSTRACT

According to an example, product test orchestration may include accessing user-defined information of a product to be tested and identifying, based upon the accessed user-defined information, a set of devices on which the product is to be tested and a set of testing tools to be implemented on the identified set of devices to test the product. Product test orchestration may further include generating test operations for the identified set of testing tools to be implemented on the identified set of devices, executing the generated test operations on the identified set of devices, tracking results of the executed test operations, and generating a report of the tracked results.

20 Claims, 13 Drawing Sheets

(51) Int. Cl.
*G06F 11/34* (2006.01)
*G06F 11/36* (2006.01)

(58) Field of Classification Search
USPC ........................................ 705/7.29
See application file for complete search history.

(56) References Cited

U.S. PATENT DOCUMENTS

| | | | |
|---|---|---|---|
| 9,262,311 B1* | 2/2016 | Johnston | G06F 11/3696 |
| 9,606,900 B1* | 3/2017 | Pradhan | G06F 8/70 |
| 10,467,131 B1* | 11/2019 | Gupta | G06F 11/3692 |
| 10,672,013 B2* | 6/2020 | BS | G06F 11/3664 |
| 2003/0204784 A1 | 10/2003 | Jorapur | |
| 2004/0268308 A1 | 12/2004 | Srivastava et al. | |
| 2005/0144529 A1 | 6/2005 | Gotz et al. | |
| 2007/0168971 A1* | 7/2007 | Royzen | G06F 11/3688 717/124 |
| 2009/0077422 A1* | 3/2009 | Khaladkar | G06F 11/3684 714/33 |
| 2010/0229155 A1 | 9/2010 | Adiyapatham et al. | |
| 2012/0266023 A1 | 10/2012 | Brown et al. | |
| 2012/0266136 A1 | 10/2012 | Brown et al. | |
| 2013/0104105 A1 | 4/2013 | Brown et al. | |
| 2013/0104106 A1 | 4/2013 | Brown et al. | |
| 2013/0275946 A1 | 10/2013 | Pustovit et al. | |
| 2014/0282433 A1 | 9/2014 | Eilam et al. | |
| 2015/0039941 A1* | 2/2015 | Kalyanasundram | G06F 11/3692 714/38.1 |
| 2015/0100832 A1 | 4/2015 | Nanjundappa et al. | |
| 2015/0113331 A1* | 4/2015 | Bhattacharya | G06F 11/3688 714/38.1 |
| 2015/0178182 A1 | 6/2015 | Mallya | |
| 2015/0301071 A1* | 10/2015 | Dhan | G01R 31/2834 702/108 |
| 2015/0331779 A1* | 11/2015 | Subramaniam | G06F 11/368 717/124 |
| 2015/0331784 A1* | 11/2015 | Nanjundappa | G06F 11/3688 717/124 |
| 2015/0339213 A1* | 11/2015 | Lee | G06F 3/0484 717/125 |
| 2016/0062879 A1 | 3/2016 | Tau et al. | |
| 2016/0162389 A1 | 6/2016 | Lachwani et al. | |
| 2016/0210224 A1* | 7/2016 | Cohen | G06F 9/44589 |
| 2016/0259712 A1 | 9/2016 | Fazunenko | G06F 11/3409 |
| 2016/0306690 A1* | 10/2016 | Underseth | G06F 11/3684 |
| 2016/0371173 A1 | 12/2016 | Ignatyev et al. | |
| 2017/0022407 A1 | 1/2017 | Hatakeyama et al. | |
| 2017/0046245 A1 | 2/2017 | Liu et al. | |
| 2017/0180238 A1* | 6/2017 | Telle | G06F 11/00 |
| 2017/0337116 A1 | 11/2017 | Negara et al. | |

\* cited by examiner

700

| ROLE | ACTIONS | Buy Button | Online Store | Admin Portal | Mail | Omni Android App | Admin iOS App |
|---|---|---|---|---|---|---|---|
| | | | | DIGITAL RETAIL CHANNELS | | | |
| CUSTOMER | Clicks on Display Ad | 1 | | | | | |
| CUSTOMER | Logs In | | 2 | | | | |
| CUSTOMER | Product Added to Cart | | 3 | | | | |
| CUSTOMER | Browses Product Info | | 4 | | | | |
| CUSTOMER | | | 5 | | | | |
| ADMIN | Checks Cart Abandonment List | | | 6 | | | |
| ADMIN | Sends Notification with Discount Code | | | 7 | | | |
| CUSTOMER | Receives Cart Recovery Notification | | | | 8 | | |
| CUSTOMER | Clicks on the Product Link | | | | 9 | | |
| CUSTOMER | Proceeds with Checkout | | | | | 10 | |
| CUSTOMER | Selects Payment Method (Credit Card) | | | | | 11 | |
| CUSTOMER | Enters Master Card xxxxxx | | | | | 12 | |
| CUSTOMER | Checks on Corrected Order | | | | | 13 | |
| CUSTOMER | Unique Order ID Generated | | | | | 14 | |
| CUSTOMER | Earns XXX Purchase Points & XXXXX | | | | 15 | | |
| CUSTOMER | Checks Confirmation Notification | | | | 16 | | |
| CUSTOMER | Order Status Check (Received) | | 17 | | | 17 | |
| ADMIN | New Order Notification | | | 18 | | | 18 |
| ADMIN | Order Status Check | | | 19 | | | 19 |
| ADMIN | Checks Capture Payment | | | | | | 20 |
| ADMIN | Order Status Check | | | 21 | | | 21 |
| CUSTOMER | Order Status Check (Confirmed) | | 22 | | | 22 | |
| ADMIN | Checks XXXXXXXX | | | | | | 23 |
| ADMIN | Order Status Check (Paid:Fulfilled) | | | 24 | | | 24 |
| CUSTOMER | Shipping Confirmation Notification | | | | 25 | | |
| CUSTOMER | Order Status Check | | 26 | | | 26 | |

| ROLE | ACTIONS | DIGITAL BANKING CHANNELS ||||
| | | App | Net Banking | Mail | SMS | ATM |
|---|---|---|---|---|---|---|
| PAYEE | Downloads Banking App from Play Store | 1 | | | | |
| PAYEE | Logs In with PIN | 2 | | | | |
| PAYEE | Generates QR Code and shares it via Mail | 3 | | | | |
| PAYER | Receives the QR Code (Payee Info) | | | 4 | | |
| PAYER | Adds the Payee | 5 | 5 | | | |
| PAYER | Transfers the Amount | 6 | | | | |
| PAYER | Receives Transaction SMS | 7 | 7 | 7 | 7 | |
| PAYEE | Receives Transaction SMS | 8 | 8 | 8 | 8 | |
| PAYEE | Logs on to Net Banking | | 9 | | | |
| PAYEE | Checks Balance | 10 | 10 | | | 10 |
| PAYEE | Visits ATM and Enters PIN | | | | | 11 |
| PAYEE | Withdraws Cash | | | | | 12 |
| PAYEE | Receives Transaction SMS | 13 | 13 | 13 | 13 | 13 |

| Input Data |
|---|
| Heart rate |
| SP02 Saturation |
| Systolic Pressure |
| Diastolic Pressure |
| Base line temperature |
| Injectate temperature |
| Temperature |

| ControllerID | Controllers |
|---|---|
| C1 | Robotic arm |
| C2 | simulator |

| ActionID | ActionName | ControllerID |
|---|---|---|
| A01 | SPO2(Saturation Level in the oxygen) -Pulse oximeter | C2 |
| A02 | NIBP (Non Invasive Blood Pressure) - Blood pressure monitor | C2 |
| A03 | Cardiac output simulation test | C2 |
| A04 | IBP (Invasive Blood pressure)-Blood pressure monitor | C2 |
| A05 | Temperature | C2 |
| A06 | Walking | C1 |
| A07 | Taking Steps | C1 |

| Condition ID | Condition | Action Type |
|---|---|---|
| CO1 | Heart rate (60 beats per minute) | A01 |
| CO2 | SP02 Saturation (in percentage) | A01 |
| CO3 | Systolic Pressure (120 mmHg) | A02 |
| CO4 | Diastolic Pressure (80 mmHg) | A02 |
| CO5 | Heart rate (60 beats per minute) | A02 |
| CO6 | Base line temperature (10dc) | A03 |
| CO7 | Injectate temperature ( 0dc) | A03 |
| CO8 | Systolic Pressure (120 mmHg) | A04 |
| CO9 | Diastolic Pressure (80 mmHg) | A04 |
| CO10 | Temperature (27dc) | A05 |

FIG. 10E

PRODUCT TEST ORCHESTRATION

PRIORITY

This application is a Continuation of commonly assigned and co-pending U.S. patent application Ser. No. 15/248,286, filed Aug. 26, 2016, and claims priority under 35 U.S.C. 119(a)-(d) to Indian patent application number 201641024090, having a filing date of Jul. 14, 2016, the disclosures of which are hereby incorporated by reference in their entireties.

BACKGROUND

Testing of products, such as computer applications, often present complex challenges. For instance, when analyzing the numerous interactions and configurations posed by such computer applications, the challenge is even greater making it difficult to reach accurate testing for all combinations of instructions. Testing is time consuming and expensive, yet critical to ensure customers have a positive experience when they use the products. The multitude of ecosystems that constitute the digital world also presents many challenges with the different components and the diverse test conditions that need to be tested in each ecosystem.

BRIEF DESCRIPTION OF THE DRAWINGS

Features of the present disclosure are illustrated by way of example and not limited in the following figure(s), in which like numerals indicate like elements, in which:

FIGS. 7-10A and 11, respectively, illustrate diagrams of industry ecosystems in which the product test orchestration apparatus depicted in FIG. 1 may test products, according to examples of the present disclosure; and FIGS. 10B-10E, respectively, illustrate charts of various parameters and various controllers that may be used in a healthcare industry ecosystem, for instance, as shown in FIG. 10A, according to an example of the present disclosure.

DETAILED DESCRIPTION

Figure 1:
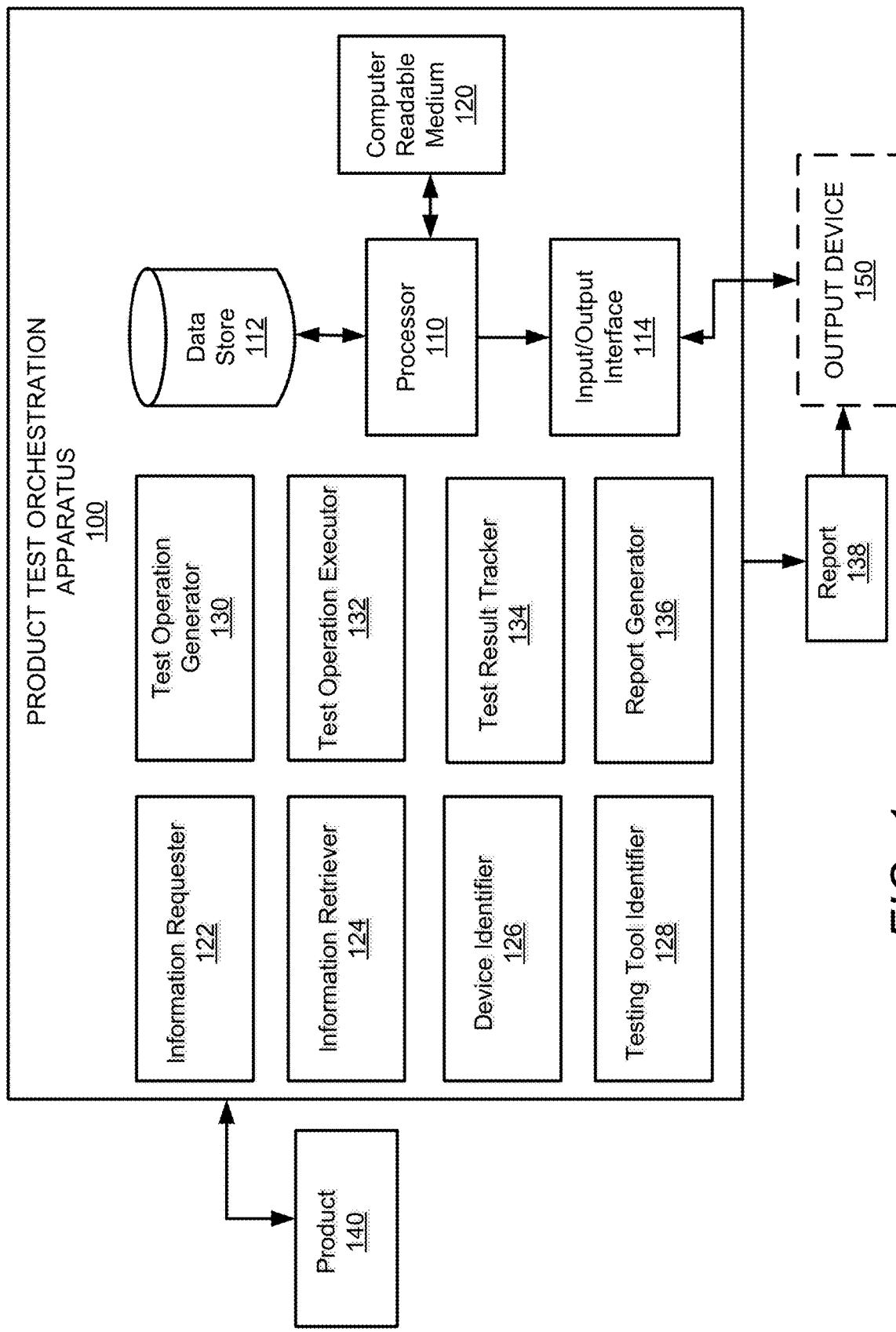
FIG. 1 illustrates a block diagram of a product test orchestration apparatus, according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Disclosed herein are a product test orchestration apparatus and methods for orchestrating a product test. As discussed in greater detail herein, the disclosed product test orchestration apparatus and methods may orchestrate product testing end-to-end across any of multiple industry ecosystems. In this regard, product testing may be orchestrated on different connected devices and channels across multiple industry verticals seamlessly. For instance, the product testing may be orchestrated to enable multi-layer testing of applications and devices, middleware, and backend devices and applications involving multiple communication protocols. The product test orchestration apparatus disclosed herein may enable for the dynamic selection of automation testing tools, devices, simulators, user inputs, and test conditions. This dynamic selection of parameters may enable for precise simulation of industry conditions using appropriate simulators and/or robotic manipulators that may replicate human and/or device movements.

According to an example, the product test orchestration apparatus disclosed herein may suggest the devices, tools, and tests to be performed on a product that may result in maximum test coverage with a minimum number of devices. The product test orchestration apparatus may determine the minimum number of devices by comparing the market coverage and/or popularity of a group of devices based upon a particular region and may select the devices from the group having the highest market coverage and/or popularity. The product test orchestration apparatus disclosed herein may also select the appropriate set of standards and protocols with which the product is to be tested.

The product test orchestration apparatus disclosed herein may generate test operations to be executed in testing the product and may execute the test operations to test the product. The product test orchestration apparatus may track results of the testing and may generate a report of the tracked results. Execution of the test operations may include, for instance, running simulations and/or controlling a robotic manipulator to mimic human interaction with a set of devices.

A technical problem associated with orchestrating a product test is how to ensure that the test accurately simulates conditions in which the product is to be used. As discussed herein, the product test orchestration apparatus disclosed herein is able to accurately test the product through analysis of user-defined information that may indicate a region in which the product is to be used as well as the devices that may use the product. In addition, appropriate simulators and/or robotic manipulators may be used to interact with the devices that are to use the product to accurately test the product. The product test orchestration apparatus and methods disclosed herein also enable the testing to be performed for products that span across multiple industry ecosystems, and thus, may accurately test products that are for use in different industries.

With reference to FIG. 1, there is shown a block diagram of a product test orchestration apparatus 100 for orchestrating a product test, according to an example of the present disclosure. The product test orchestration apparatus 100 may include an information requester 122 to request information via a user interface. An information retriever 124 may access user-defined information of a product 140 to be tested. A device identifier 126 may identify a set of devices on which the product 140 is to be tested. A testing tool identifier 128 may identify a set of testing tools to be implemented on the identified set of devices to test the product 140. A test operation generator 130 may generate test operations for the identified set of testing tools to be implemented on the identified set of devices. A test operation executor 132 may execute the generated test operations on the identified set of devices. A test result tracker 134 may track results of executed test operations. A report generator 136 may generate and output a report 138 of the tracked results.

In some examples, the elements of the apparatus 100 may be machine readable instructions stored on a non-transitory computer readable medium. In this regard, the apparatus 100 may include or be a non-transitory computer readable medium. In some examples, the elements of the apparatus 100 may be hardware or a combination of machine readable instructions and hardware.

According to an example, the apparatus 100 may include a processor 110, a data store 112, an input/output interface 114, and a computer readable medium 120. The product test orchestration apparatus 100 may be a server computer (e.g., a computer running server software), a personal computer, a laptop computer, a tablet computer, a set of components (e.g., circuits) to perform computing operations, etc.

The processor 110 may be any of a central processing unit (CPU), a graphics processing unit (GPU), a semiconductor-based microprocessor, an application specific integrated circuit (ASIC), and/or other hardware device suitable for retrieval and execution of instructions stored in the computer readable medium 120. The computer readable medium 120 may be any electronic, magnetic, optical, or other physical storage device that contains or stores executable instructions. Thus, the computer readable medium 120 may be, for example, Random Access Memory (RAM), an Electrically Erasable Programmable Read-Only Memory (EEPROM), a storage device, an optical disc, and the like. The computer readable medium 120 may be a non-transitory computer readable medium, where the term "non-transitory" does not encompass transitory propagating signals.

The processor 110 may fetch, decode, and execute instructions stored on the computer readable medium 120. According to an example in which the apparatus 100 includes only the processor 110, the data store 112, the input/output interface 114, and the computer readable medium 120, the instructions may include instructions to request information via a user interface, instructions to access user-defined information of a product to be tested, instructions to identify a set of devices on which the product is to be tested, instructions to identify a set of testing tools to be implemented on the identified set of devices to test the product, instructions to generate test operations, instructions to execute the generated test operations, instructions to track results of executed test operations, and instructions to generate/output the report 138 of the tracked results. As an alternative or in addition to retrieving and executing instructions, the processor 110 may include one or more electronic circuits that include electronic components for performing the functionalities of the instructions stored on the computer readable medium 120. As another alternative, a separate product test orchestration apparatus (not shown) may execute some of the instructions such that the instructions may be executed by a distributed set of product test orchestration apparatuses, e.g., multiple server computers.

The data store 112 may be volatile and/or non-volatile memory, such as DRAM, EEPROM, MRAM, phase change RAM (PCRAM), memristor, flash memory, and the like. The data store 112 may store information such as information pertaining to the product 140 to be tested, which is also referred to herein as a computer-implemented product to be tested. According to an example, the product 140 to be tested may be a computer application or a suite of associated computer applications that may be executed on devices across an entire industry ecosystem. The industry ecosystem may include, for instance, for a particular type of industry, various types of user computing devices, various types of Internet browsers, various types of middleware, various types of backend systems, various protocols and standards, etc.

In addition, the product 140 may be tested across multiple platforms, with respect to multiple standards and protocols, etc. By way of particular example, the product 140 may be used in any of a variety of different types of industries including, but not limited to, health care, retail, banking, and connected home. As discussed in greater detail herein, various sets of devices and testing tools may be selected depending upon various factors including the type of industry in which the product 140 is to be used.

According to an example, the information requester 122 may be executed by the processor 110 to request information pertaining to the product 140 to be tested via a user interface and may store information received via the user interface in the data store 112. The user-defined information received via the user interface may include, for instance, the location, e.g., geography, of where the product is to be tested, a user profile of a user of the product, etc. The device identifier 126 and the testing tool identifier 128 may respectively select a set of devices on which the product 140 is to be tested and select a set of testing tools to be implemented on the selected set of devices to test the product 140 based upon the user-defined information. In addition, the test operation generator 130, the test operation executor 132, the test result tracker 134, and the-report generator 136 may respectively generate test operations, execute the generated test operations, track results of the executed test operations, and generate/output a report 138 of the tracked results.

According to an example, the generated report 138 may be output to an output device 150 via the input/output interface 114. The input/output interface 114 may include hardware and/or software to enable communication with the output device. The input/output interface 114 may enable a wired or wireless connection to the output device 150, e.g., may be a connection via the Internet, a local area network, a direct connection, etc. The input/output interface 114 may further include a network interface card and/or may also include hardware and/or software to enable communication with various input and/or output devices, such as a keyboard, a mouse, a display, another computing device, etc., through which a user may input instructions into the product test orchestration apparatus 100. For instance, the output device 150 may be a user's computing device that may be implemented to display a user interface containing requests for information from a user, to input user-defined information about a product to be tested, and to display the generated report. The output device 150 may additionally or alternatively be a separate computing device or an external data storage on which the generated report may be stored.

Figure 2A:
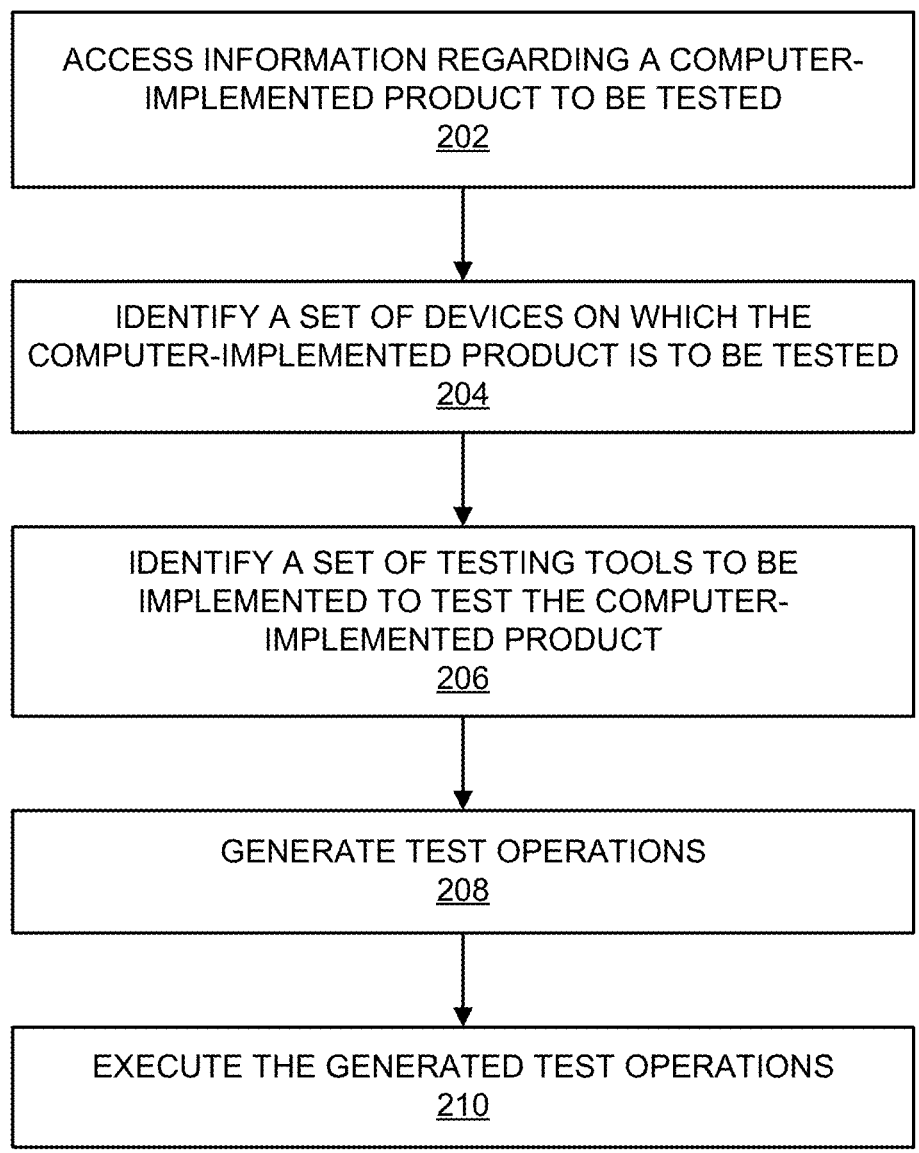
FIGS. 2A, 2B, and 3, respectively, illustrate flow diagrams of methods for orchestrating a product test, according to examples of the present disclosure.
Figure 2B:
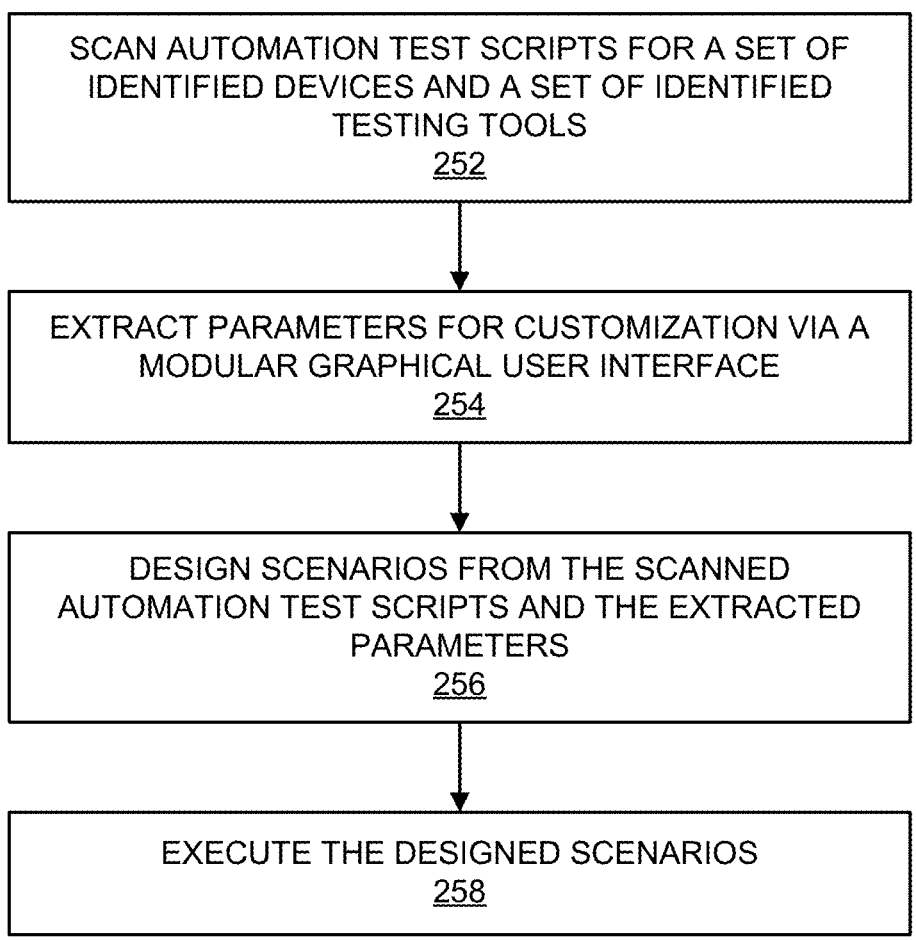
Figure 3:
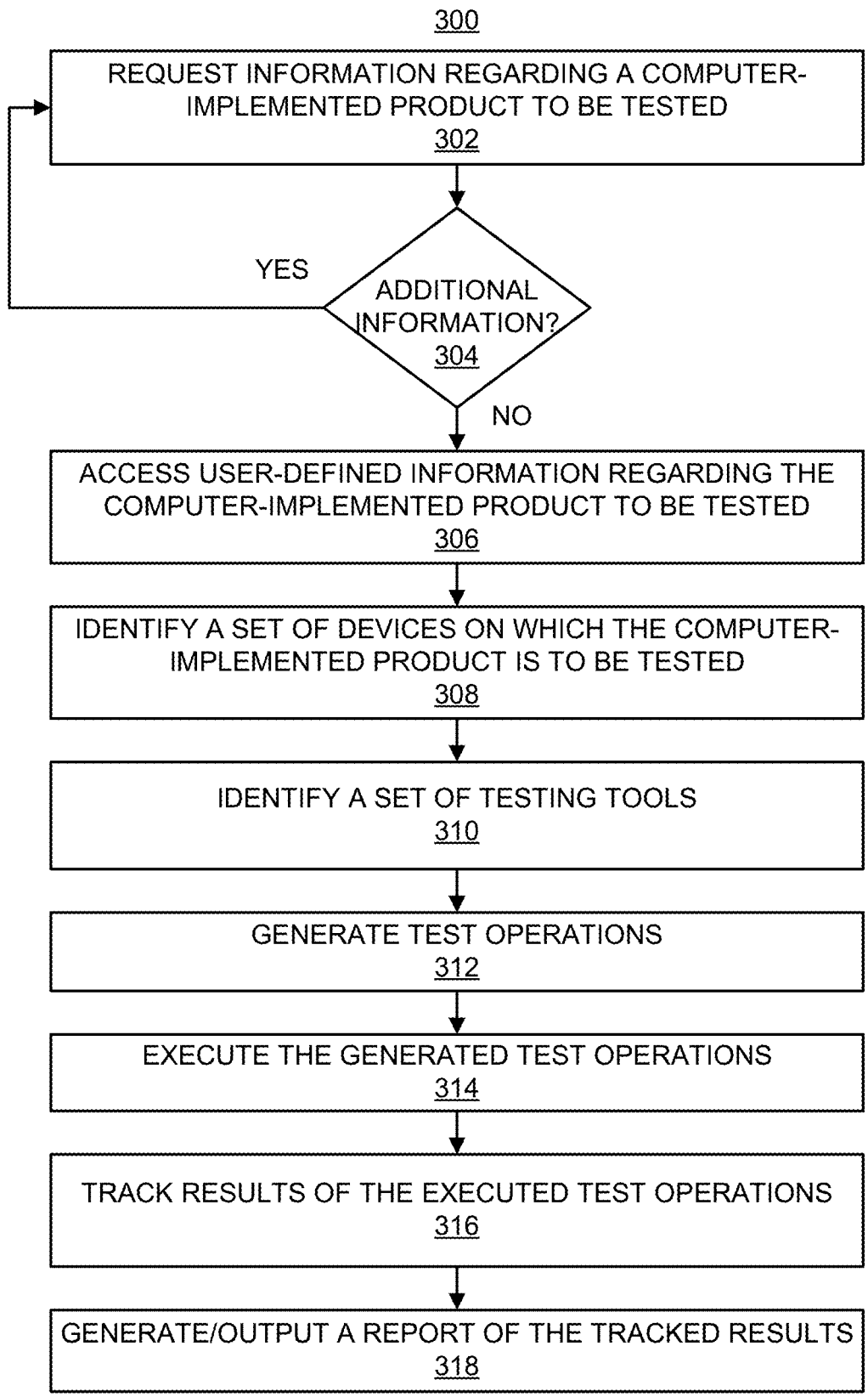

With reference now to FIGS. 2A, 2B, and 3, there are respectively shown flow diagrams of methods 200, 250, and 300 for orchestrating a product test, according to examples of the present disclosure. It should be understood that the methods 200, 250, and 300 disclosed herein may include additional operations and that some of the operations described therein may be removed and/or modified without departing from the scopes of the methods 200, 250, and 300. Generally, the processor 110 of the product test orchestration apparatus 100 may implement or execute some or all of the instructions associated with the information requester 122 to the report generator 136 to perform the methods 200, 250, 300 disclosed herein.

At block 202, the information retriever 124 may access information regarding a computer-implemented product 140 to be tested. The computer-implemented product 140 may also be termed a "product" herein. According to an example, the product 140 may be a computer application or a suite of associated computer applications that may be executed across an industry ecosystem. By "associated," it may be meant that computer applications running on different computers or computing platforms may work together to provide a service in an industry. The industry ecosystem may include, for instance, for a particular type of industry, various types of user computing devices, various types of Internet browsers, various types of middleware, various types of backend systems, various protocols and standards, etc. In addition, the product 140 may be tested across multiple platforms, with respect to multiple standards and protocols, etc. Thus, for instance, depending upon the industry in which the product 140 is to be used, different types of computing devices as well as various other considerations may be tested. Various examples in which the method 200 may be implemented for ecosystems of different types of industries are discussed herein.

The information accessed at block 202 may be user-defined information, for instance, information that a user has provided to the product test orchestration apparatus 100 via a user interface. The user-defined information may be accessed from the data store 112. A user may provide the user-defined information by responding to requests for information provided through the user interface. The requests for information may be provided in the form of a questionnaire via the user interface and may be provided as an interactive user interface. For instance, as a user inputs responses to the questions in the questionnaire, the user may be prompted to provide additional information based upon the inputted responses.

The user-defined information may include, for instance, requirements of the product, user conditions to be tested, parameters to be used in the testing of the product, an industry in which the computer-implemented product 140 is to be used, etc. By way of example, the user-defined information may include a location, e.g., geography, where the product 140 is to be tested, a user profile, device and channel conditions, access conditions, backend conditions, etc. The user defined information may also include, for instance, a computer application to be tested, which may include a computer application directed to banking, retail, hospitality, transit, medical, business-to-business, business-to-consumer, or the like. The user defined information may further include, for instance, the type of application, e.g., native, hybrid, or the Internet, different types of operating systems, browsers, etc. The product 140 to be tested may include smart phones, tablets from various manufacturers, heath care devices, such as wearable devices, blood pressure monitors, etc. The channels may include smart phones, the World Wide Web, a kiosk, etc.

At block 204, the device identifier 126 may identify a set of devices on which the product 140 is to be tested based upon the information accessed at block 202. The accessed information may indicate which types of devices on which the product 140 is to be tested as well as the industry in which the product 140 is to be used. Based upon the accessed information, the device identifier 126 may identify a group of devices, e.g., smartphones, tablet computers, laptop computers, user-wearable devices, or the like, that matches the indicated types of devices and the indicated industry. In addition or alternatively, the accessed information may indicate the set of devices on which the product 140 is to be tested.

By way of example in which the indicated industry is the retail industry, and particularly, the online retail industry, a user may have indicated that the devices include smartphones, tablet computers, and laptop computers through which consumers may purchase goods over the Internet. In this example, the device identifier 126 may identify the group of devices as including all commercially available smartphones, tablet computers, and laptop computers that run under the Android™, Windows™, or iOS™ operating systems.

The device identifier 126 may also identify the set of devices to include devices that operate as part of the indicated industry ecosystem of the product. These devices may include, for instance, computing devices that run backend servers for the industry ecosystem. In keeping with the retail industry ecosystem example discussed above, the backend servers may provide a web portal through which consumers may view and select to purchase goods. The backend servers may also process payments, track orders, output order confirmation emails, and perform other transaction related services.

According to an example, instead of identifying all of the possible devices on which the product 140 may be implemented or all of the devices indicated in the user-defined information, the device identifier 126 may limit the set of the devices to a reduced number of devices. In this example, the device identifier 126 may calculate respective market coverage of a group of devices that matches criteria or parameters in the user-defined information and may identify the set of devices upon which the product 140 is to be tested. In addition, or alternatively, the device identifier 126 may calculate a respective market coverage of a user-selected group of devices. The device identifier 126 may also determine the popularities of the user-indicated devices and may identify the set of devices on which the product 140 is to be tested based upon the determined popularities of the devices. For instance, the device identifier 126 may determine the market coverage and popularity information for the devices from a third-party source (not shown) and may store that information in the data store 112. The device identifier 126 may also update that information periodically, e.g., about every 2 weeks, about every 3 months, etc.

According to an example, the device identifier 126 may identify the set of devices to include those devices having the highest market coverage and/or the highest popularities. For instance, the device identifier 126 may identify the set of devices to include a user-defined number of devices having the highest market coverage. The user-defined number of devices may be based upon any of a number of factors, including a user's preference, the relevant industry in which the product 140 is to be used, etc. As the market coverage and the popularities of the devices may vary for different regions, the device identifier 126 may identify the set of devices having the highest market coverage and/or the highest popularities based upon the region, e.g., geographic location, at which the product 140 is to be used. In addition, the device identifier 126 may present the devices and their respective market coverage and/or popularities to the user and the user may select a set of the devices to be used in the testing of the product, for instance, based upon the market coverage and/or popularities.

The user-defined information may also include the country, the application type, the connectivity type, etc., regarding the product 140 to be tested. The different domain applications may include applications related to banking, retail, hospitality, travel, transit, medicine, or the like. The application types may include native, hybrid, Web applications, etc. Connectivity types may include near field communication, Bluetooth™, Wi-Fi, etc. The device identifier 126 may also identify the set of devices on which the product 140 is to be tested based upon the country, the application type, the connectivity type, etc., regarding the product 140 to be tested. The device identifier 126 may further provide the user with a list of the identified set of devices based upon features on the devices, including, Bluetooth™ versions of the devices, whether the devices are capable of near field communications, whether the devices are Wi-Fi capable, network connectivity supported by the devices, etc. The user may thus select a set of devices that are to be used in testing the product 140 based upon the identified features of the devices.

In addition to identifying the set devices, the device identifier 126 may identify other elements to be tested. The other elements to be tested may include different types of Internet browsers, different types of channels, different types of operating systems, different types of applications, etc. The other elements may be elements that a user has defined, for instance, by providing responses to information requests in the questionnaire. The channels to be tested may include, for instance, whether an interface of the product 140 is web-based, mobile-based, provided on a kiosk, etc. The applications to be tested may include whether the applications are business-to-business applications, business-to-consumer applications, health care related applications, retail related applications, banking related applications, telecom related applications, etc.

At block 206, the testing tool identifier 128 may identify a set of testing tools to be implemented to test the product 140. The testing tool identifier 128 may identify testing tools for different testing types that may ensure integration with DevOps, third party tools, and application lifecycle management support. The testing tool identifier 128 may identify testing tools that ensure maximum test coverage on the set of devices identified at block 204. The device identifier 126 may identify the devices having the highest market coverage for a particular region that match a user's identified requirements.

According to an example, the testing tool identifier 128 may identify the testing tools based upon responses or answers from a user. For instance, the testing tool identifier 128 may evaluate the user responses and may recommend testing tools (or equivalently, testing services) that may be needed to test the product. The testing tool identifier 128 may tailor the recommended testing tools to the industry, problems, expectations, and goals of the user. The testing tools may vary for different types of applications. For instance, for testing software, the testing tools may include QuickTest Professional™ available from the Hewlett-Packard™ Company, Selenium™ software testing, etc. For smartphones and tablets, the testing tools may include the SeeTest™ automation tool, the Perfecto™ automation tool, etc. The different types of testing may include functional, nonfunctional performance, security, load testing, etc., or combinations thereof. The user-defined information containing the responses may be used to identify the set of testing tools from a group of previously evaluated testing tools. Data pertaining to the group of previously evaluated testing tools, which may be automation tools, may be stored in the data store 112 and the testing tool identifier 128 may access the data in identifying the set of testing tools. The previously evaluated testing tools may be third party testing tools (e.g., best in class third party testing tools), home grown testing tools, or the like.

The user-defined information may include user-specified key performance indicators and the testing tool identifier 128 may identify the testing tools from the group of previously evaluated testing tools to include in the set of testing tools based upon the user-specified key performance indicators as well as the identified set of devices on which the product 140 is to be tested. That is, the testing tool identifier 128 may identify the testing tools for the set of testing tools to be the testing tools in the group of previously evaluated testing tools that meet the user-defined key performance indicators and are for the identified set of devices. The user-defined key performance indicators may include, for instance, deployment model, remote testing capability, integration with third party tools, parallel execution capabilities, licensing, non-functional testing, etc. According to an example, the testing tool identifier 128 may, based upon the user responses, give different weights to each of the key performance indicators based on industry standards. In this example, the testing tool identifier 128 may identify the set of testing tools based upon the weights given to the key performance indicators identified by the user. The testing tool identifier 128 may also provide the user with the identified set of testing tools and the user may select the testing tools to be used from the identified set of testing tools.

The testing tool identifier 128 may execute the following code to identify the testing tools at block 206. It should be clearly understood that the following code is provided as an example and should not be construed as limiting the present disclosure to the features recited in the following code.

```
@GET
@Produces(MediaType.APPLICATION_JSON)
public Response getTopFiveService( )
{
    ToolAnalysisDAO toolAnalysisDAO = new ToolAnalysisDAO(ds);
    List<Tool> topFive = new ArrayList<Tool>( );
    List<Tool> allTools;
    try {
        allTools = toolAnalysisDAO.getToolScores( );
        allTools.sort(new ScoreComparator( ));
        if(allTools.size( ) <= 5)
            topFive.addAll(allTools);
        else
            for(int i = 0; i < 5; i++){
                topFive.add(allTools.get(i));
            }
    } catch (SQLException e) {
        LOGGER.error(e.getMessage( ));
        return Response.status(Status.INTERNAL_SERVER_ERROR)
                .entity(new ResponseStatus(100,
        "Internal Server Error"))
                .build( );
    }
    return Response.ok(topFive).build( );
}
```

At block 208, the test operation generator 130 may generate test operations for the identified set of testing tools to be implemented on the identified set of devices. For instance, the test operation generator 130 may generate a system model that includes the set of devices identified at block 204 and the set of testing tools identified at block 206. The system model may involve a series of questions to list the devices to be tested and the test tools to be selected. The series of questions may include different types of user parameters input, e.g., geography where the system is to be tested; different types of browsers to be tested; different types of channels, e.g., mobile, web, tablet, point of sale, wearables to be tested, etc.; tool selection, which may include a series of questions that the user answers for the system to recommend a best of class third party tool and home grown tool, particular type of testing to be performed, and test management tool. The tool selection may be based on key performance indicators (KPIs) and the type of testing to be performed. The tool selection is based on 40+ KPIs such as deployment model, remote testing capability, integration with third party tools, parallel execution capability, etc.

According to an example, the test operation generator 130 may write test automation scripts to generate the test operations. That is, for instance, the test operation generator 130 may write test automation scripts that are to be executed to test how a product 140 operates on the identified set of devices and across an industry ecosystem. The test operation generator 130 may write a respective test automation script for each of the devices in the set of devices identified at block 204. In addition, the test operation generator 130 may write the test automation scripts to control the identified set of devices, either individually or in parallel with each other, to implement the identified set of testing tools. By way of example, the test operation generator 130 may write the test automation scripts using the TestNG framework. In addition, or alternatively to writing the test automation scripts, the test operation generator 130 may access previously written test automation scripts that may correspond to the identified set of devices and testing tools. The previously written test automation scripts may be for the same industry or for a different industry, i.e., the test automation scripts may be reused across multiple industries.

At block 210, the test operation executor 132 may execute the generated test operations. The test operation executor 132 may implement an adapter that provides a custom API for handling lifecycle and configuration of test drivers, clients, etc. For instance, the test operation executor 132 may parameterize the use of application programming interface (API) scripts using MS Excel™, test drivers, clients, etc. In other words, the test operation executor 132 may provide an API for MS Excel™-based keyword driven test script preparation. The APIs may have built-in capabilities to grab screenshots, which may be saved from within the test operations. The test operation executor 132 may also export the generated test operations as a Java Archive (JAR) file for scenario formation.

The test operation executor 132 may scan the JAR file for available test steps. For instance, the test operation executor 132 may use Java reflection to identify the available test steps, e.g., the test steps may be identified by the @Testa TestNG annotation in the test methods. The test operation executor 132 may also check for a keyword MS Excel™ file, for instance using the Apache POI library, and may use parameters of the test steps available in the JAR file to parameterize the test steps. The test steps scanning may be performed and the test steps may be represented as a Java model to be shown in a user interface. An example of code that the test operation executor 132 may execute to parameterize the scripts (e.g., test steps) is provided below. It should be clearly understood that the following code is provided as an example and should not be construed as limiting the present disclosure to the features recited in the following code.

```
private void addDataStorePrameters(ClassData classData, Method method,
      ObservableList<StepParameter> parameters) {
   if (classData != null) {
      MethodData methodData =
         classData.getMethodData(method.getName( ));
      if (methodData != null) {
         for (Entry<String, String> entry: methodData.getData( )
               .entrySet( )) {
            parameters.add(new
                  StepDataStoreParameter(entry.getKey( ),
                  entry.getValue( )));
         }
      }
   }
}
private void addParameters(Method method,
      ObservableList<StepParameter> parameters) {
   Parameters parametersAnnotation = method
         .getAnnotation(Parameters.class);
   if (parametersAnnotation != null) {
      Annotation[ ][ ] methodParameterAnnotations = method
            .getParameterAnnotations( );
      String[ ]parameterKeys = parametersAnnotation.value( );
      for (int i = 0; i < parameterKeys.length; i++) {
         Optional defalutParameter = getDefaultParameter(
               methodParameterAnnotations, i);
         parameters.add(new
               StepMethodParameter(parameterKeys[i],
               defaultParameter !=null ?
                     defaultParameter.value( )
                     : ""));
      }
   }
}
```

An example of code that the test operation executor 132 may execute to scan the test steps is provided below. It should be clearly understood that the following code is provided as an example and should not be construed as limiting the present disclosure to the features recited in the following code.

```
File currentFile = new File(testScript.getPath( ));
URLClassLoader urlClassLoader = new URLClassLoader(
      new URL[ ] { currentFile.toURI( ).toURL( ) },
      Utils.getClassPathClassLoader( ));
List<Step> steps = new ArrayList<>( );
Class<?> clazz = Class.forName(fullyQualifiedClassName, false,
      urlClassLoader);
ClassData classData = dataStore
      .getClassData(fullyQualifiedClassName);
for (Method method : clazz.getMethods( )) {
   Test testAnnotation = method.getAnnotation(Test.class);
   if (testAnnotation != null) {
      ObservableList<StepParameter> parameters = FXCollections
            .observableArrayList( );
      addParameters(method, parameters);
      addDataStorePremeters(classData, method, parameters);
      StepMethod stepMethod = new StepMethod(method.getName( ),
            parameters);
      Step step = new TestNGStep(currentFile.toString( ), clazz
            .getPackage( ).getName( ), clazz.getSimpeName( ),
            stepMethod, testAnnotation.description( ));
      steps.add(step);
   }
}
```

The test operation executor 132 may design Scenarios from the available test steps, in which a Scenario may be defined as a Java model that is similar to the TestNG Test Suite. A Scenario may contain test steps and test cases, in which test steps may be grouped into test cases and a group of test cases may form a Scenario. The parameters and keywords used for a test step may be customized in a test Scenario design screen via run time. In addition, designed Scenarios may be saved as a project and a project may be imported in another project. Moreover, keywords and parameters available in Scenarios may be exported as MS Excel™ files and may be imported back with updated values.

Figure 4:
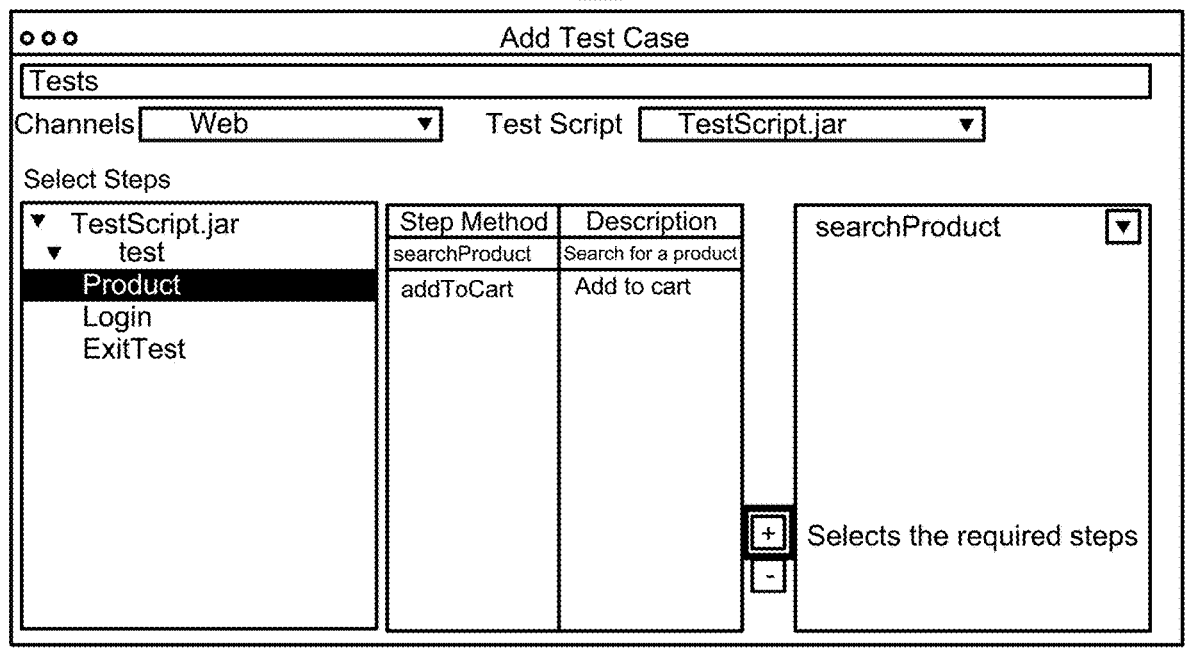
FIGS. 4 and 5, respectively, illustrates user interfaces, according to examples of the present disclosure.

According to an example, the test operation executor 132 may present a scanned test step model to a user via a user interface and the user may select the required steps from the user interface to design a Scenario. An example of a user interface 400 is depicted in FIG. 4.

Figure 5:
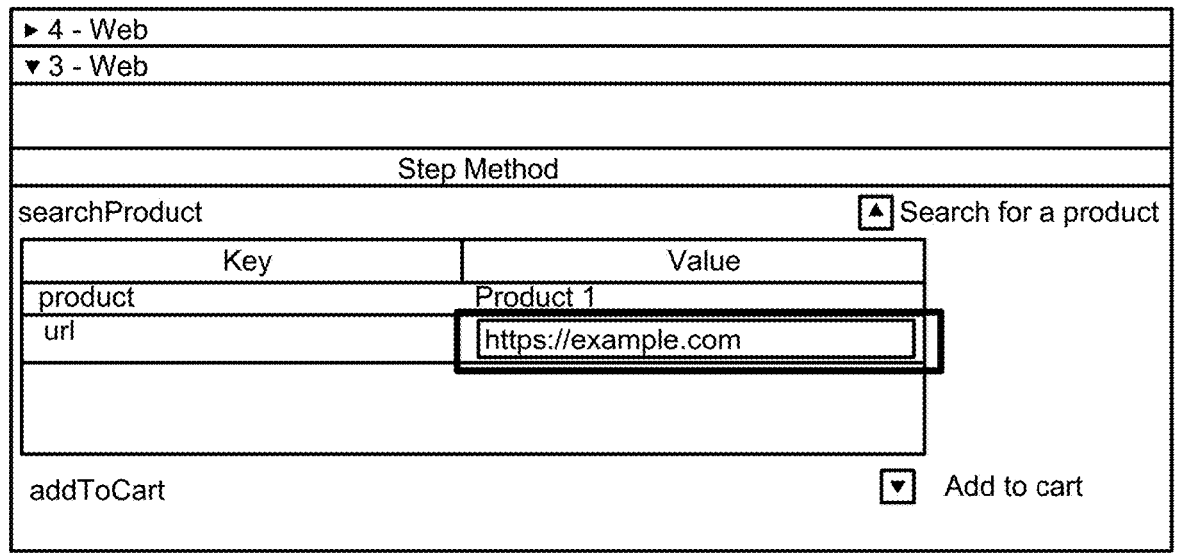

The test operation executor 132 may synchronize a designed Scenario, test automation scripts, and execution results with a test management tool. In addition, the test operation executor 132 may synchronize the execution results with an application life cycle management tool, which may provide a latest update on an execution status of a Scenario. The parameters of the test steps may also be updated through the user interface, in which case, the model object may be updated and, during execution, the model object may be used to get the parameters. An example of a user interface 500 in which a parameter of a test step may be updated is shown in FIG. 5.

According to an example, the test operation executor 132 may execute the test automation scripts written at block 206. By way of example, execution of the test automation scripts, which may equivalently be construed as execution of a designed Scenario, may result in features of the product 140 being implemented on the devices identified at block 204. In one example, the test automation scripts may be implemented on the devices for which the test automation scripts have been written. In addition, the test automation scripts (designed Scenarios) may be implemented on the devices individually or in parallel. In other words, in an example in which a first device is a device that runs iOS™ and a second device is a device that runs the Android Operating System™, a first test automation script may be executed on the first device and a second test automation script may be executed on the second device. In addition, the first test automation script may be executed prior to execution of the second test automation script or the first test automation script may be executed concurrently with the second test automation script.

According to an example, a scenario model may be passed to a scenario runner service where the scenario model may be converted into TestNG test suites and executed. For instance, a channel testing scenario, which may include customized parameter values may be converted to TestNG test suite for execution. An example of code that the test operation executor 132 may execute to convert the channel testing platform scenario to a TestNG suite is provided below. It should be clearly understood that the following code is provided as an example and should not be construed as limiting the present disclosure to the features recited in the following code.

```
private XmlSuite prepareSuite(TestSuite testSuite, DataStore dataStore)
throws Exception {
    XmlSuite suite = new XmlSuite( );
    suite.setName(testSuite.getName( ));
    prepareTests(testSuite, suite, dataStore);
    return suite;
}
private void prepareTests(TestSuite testSuite, XmlSuite suite,
        DataStore dataStore) throws Exception{
    int testCaseIndex = 0;
    for (TestCase testCase : testSuite.getTestCases( )) {
        XmlTest test = new XmlTest(suite);
```

-continued

```
        test.setName(String.format("%s - %s",
                testCase.getTestCaseName( ), testCase.getChannel( )));
        if (testCase.getType( ) = = Type.TEST_NG) {
            List<XmlClass> classes = prepareTestNGClasses(testCase,
                dataStore);
            test.setClasses(classes);
        } else {
            List<XmlClass> classes =
                prepareQTPClasses(testCase.getSteps( ), testCaseIndex),
            test.setClasses(classes);
        }
        testClaseIndex++;
    }
}
```

Adapter customizations and keyword and parameter customizations may be applied during execution of the Scenario and parallel execution may be achieved by providing separate adapter instances for each thread. The adapters may provide the drivers, clients, etc., instances while the TestNG suite is being executed. The adapters may be configured in the user interface and the configured adapters may be provided to the scripts during execution. An example of code that the test operation executor 132 may execute to configure the adapters is provided below. It should be clearly understood that the following code is provided as an example and should not be construed as limiting the present disclosure to the features recited in the following code.

```
private void configureAdapters(URLClassLoader urlClassLoader,
        Adapters adapters) {
    try {
        Reflections reflections = new Reflections("adapters",
            urlClassLoader);
        Set<Class<? Extends Adapter>> adaptersSet =
            reflections.getSubTypesOf(Adapter.class);
        // Update adapter property for each thread from the
        // properties provided by the user
        for (int i = 0; i < noOfThreadsProperty.getValue( ); i ++) {
            Iterator<Class<? Extends Adapter>> adapterIterator =
                adaptersSet.iterator( );
            Map<String, Adapter> adapterMap = new HashMap<>( );
            while (adapterIterator.hasNext( )) {
                Adapter adapter = adapterIterator.next( ).newInstance( );
                updateAdapter(i, adapterMap, adapter);
            }
            adapters.addAdapterMap(adapterMap);
        }
    } catch (InstantiationException 1 IllegalAccessException e) {
        e.printStackTrace( );
    }
}
```

The TestNG suites may execute the generated test suite in parallel by passing the number of threads parameters to a TestNG runner. An example of code that the test operation executor 132 may execute to execute multiple TestNG suites in parallel is provided below. It should be clearly understood that the following code is provided as an example and should not be construed as limiting the present disclosure to the features recited in the following code.

```
TestNG testNG = new TestNG( );
if (reportFolder != null) {
    testNG.setOutbutDirectory(reportFolder);
}
testNG.setUseDefaultListeners(false);
testNG.addListener((Object) new ApiListener(dataStoreMap));
testNG.addListener((Object) new StatusUpdaterListener(this));
reportListener = new ReportListener(adapterConfigurations);
```

-continued

```
testNG.addListener(reportListener);
if (noOfThreadsProperty.getValue( ) > 1) {
    testNG.setThreadCount(noOfThreadsProperty.getValue( ));
    testNG.setSuiteThreadPoolSize(noOfThreadsProperty.getValue( ));
}
testNG.setXmlSuites(suites);
setSecuritManager( );
testNG.run( );
unsetSecurityManager( );
adapters.cleanup( );
```

According to an example, a test automation script may control a robotic manipulator that is to mimic user interactions with the identified set of devices. That is, the test operation executor 132 may execute a test automation script that controls the robotic manipulator to, for instance, interact with a touchscreen of a smartphone. As another example, the test operation executor 132 may execute a test automation script that controls the robotic manipulator to position a smartphone to be in communication with a point-of-sale device such that a near field communication operation may be performed between the smartphone and the point-of-sale device. In this example, the test operation executor 132 may execute a test automation script for each of the devices in the identified set of devices such that applications of a product 140 may be tested on those devices.

Figure 6:
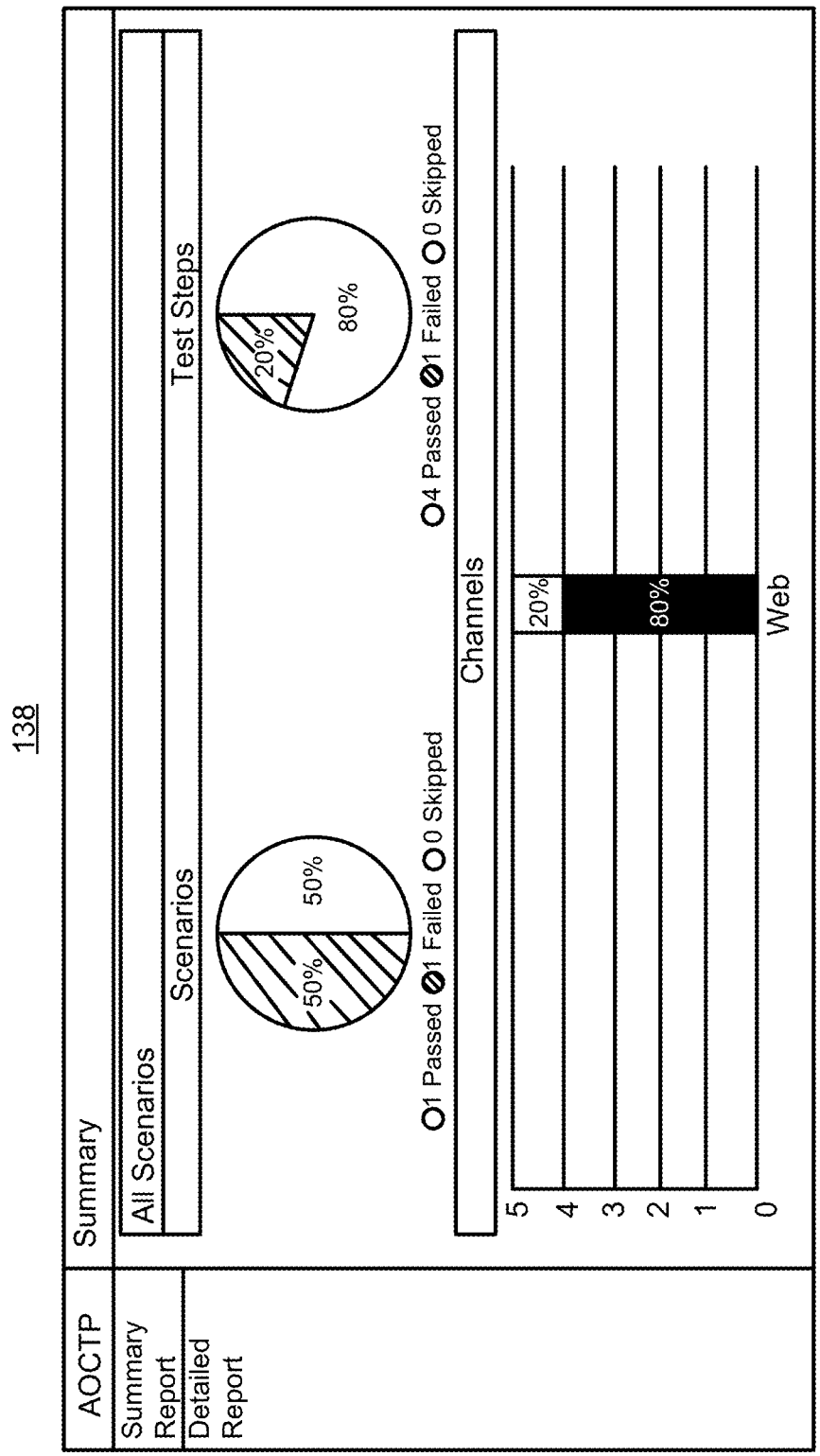
FIG. 6 illustrates a report, according to an example of the present disclosure.

Execution of the test automation scripts may result in the set of testing tools identified at block 206 being implemented on the devices identified at block 204. Various examples in which the test automation scripts may be executed are described in greater detail herein. In addition, as discussed in greater detail below with respect to FIG. 3, during execution of the test automation scripts (e.g., test operations), results of the executed test operations may be tracked. Moreover, the report 138 of the tracked results may be generated and may also be outputted. The report 138 may be collected from the TestNG framework and may be processed by a report listener function of the TestNG framework. The report listener may also generate HTML or PDF reports and may send the report 138 for test analytics. An example of a report 138 that may be generated is depicted in FIG. 6. As shown in that figure, the report 138 may display various information regarding the Scenarios and the test steps.

Turning now to FIG. 2B, at block 252, the test operation executor 132 may scan automation test scripts for a set of identified devices and a set of identified testing tools. The test operation executor 132 may scan the automation test scripts (or equivalently, the test steps) as discussed above with respect to block 210 in FIG. 2A.

At block 254, the test operation executor 132 may extract parameters for customization via a modular graphical user interface. The test operation executor 132 may extract parameters for customization as also discussed above with respect to block 210 in FIG. 2A.

At block 256, the test operation executor 132 may design scenarios from the scanned automation test scripts and the extracted parameters. The test operation executor 132 may design the scenarios as discussed above with respect to block 210 in FIG. 2A.

At block 258, the test operation executor 132 may execute the designed scenarios. The test operation executor 132 may execute the scenarios as discussed above with respect to block 210 in FIG. 2A. As also discussed above, the test operation executor 132 may customize an adapter API for parallel execution of the designed scenarios on multiple digital channels.

With reference now to FIG. 3, at block 302, the information requester 122 may request information from a user via a user interface. For instance, the information requester 122 may cause a user interface to be displayed on the display of a user's computing device over a network connection. The user interface may include a questionnaire that includes a list of questions related to a product 140 that the user would like to have tested. The questions may include, for instance, types of channels to be tested, types of operating systems to be tested, types of Internet browsers to be tested, geographic region in which an application associated with the product 140 is to be tested, types of applications associated with the product 140 to be tested, the industry or industries in which the product 140 is to be used, and the like. The types of channels may include whether the product 140 is to be tested on mobile devices, tablet computers, wearable computing devices, point-of-sale devices, etc. The types of operating systems may include, for instance, iOS™, Android™ Windows™, or the like.

At block 304, the information requester 122 may process responses to the questions and determine if additional information is to be gathered from the user. For instance, the information requester 122 may determine, based upon the responses received from the user, that additional information should be collected. In this case, the information requester 122 may request for additional information at block 302 through the user interface. The request for the additional information may include second level questions, for instance, that are more specific to the aspects of the product 140 to be tested. By way of example, the additional information may pertain to the user's expectations and goals associated with the product 140 testing. As another example, the additional information may pertain to key performance indicators that the user would like the testing tools to include. The key performance indicators may include, for instance, deployment model, integration to third party tools, remote testing capability, parallel execution capability, licensing, non-functional testing, and the like.

The information requester 122 may repeat blocks 302-304 until a determination is made that no additional information is required or that sufficient information has been obtained. The information requester 122 may also store the information received from the user in the data store 112. Following the "no" condition at block 304, the information retriever 124 may access user-defined information regarding the computer-implemented product 140 (or simply, product) to be tested. The user-defined information may be the information supplied by the user via the user interface in responding to the questions contained in the questionnaire and the follow on questions, which may be stored in the data store 112. The information retriever 124 may thus access the user-defined information from the data store 112.

At block 308, the device identifier 126 may identify a set of devices on which the computer-implemented product 140 is to be tested. The device identifier 126 may identify the set of devices in similar manners to those discussed above with respect to block 204 in FIG. 2A.

At block 310, the testing tool identifier 128 may identify a set of testing tools to be implemented on the identified set of devices to test the product. The testing tool identifier 128 may identify the set of testing tools in similar manners to those discussed above with respect to block 206 in FIG. 2A.

According to an example, the device identifier 126 and the testing tool identifier 128 may respectively access information contained in a database or databases pertaining to the devices and the testing tools based upon the responses provided by the user. That is, for instance, based upon the responses to the questionnaire, the device identifier 126 and the testing tool identifier 128 may respectively fetch device names and testing tools from the databases, which may be periodically updated. The device identifier 126 and the testing tool identifier 128 may respectively filter the fetched device names and testing tools, for instance, based upon market share and/or popularity, and may recommend the highest ranking devices and testing tools to the user. A recommendation may also be made to the user as to the types of testing to be performed. In this example, the user may respond to the recommendations by selecting certain ones of the recommended devices, testing tools, and testing to be implemented. In other examples, however, the recommended devices, testing tools, and testing to be implemented may be automatically selected.

At block 312, the test operation generator 130 may generate test operations for the identified set of testing tools to be implemented on the identified set of devices. The test operation generator 130 may generate the test operations in similar manners to those discussed above with respect to block 208 in FIG. 2A. In addition, the test operation generator 130 may generate the test operations for the devices that have been selected by the user or have been selected automatically. The test operation generator 130 may also generate the test operations for the recommended testing tools and tests and/or the user-selected testing tools and/or tests.

At block 314, the test operation executor 132 may execute the generated test operations on the identified set of devices. The test operation executor 132 may execute the test operations in similar manners to those discussed above with respect to block 210 in FIG. 2A. For instance, the test operation executor 132 may execute the test operations on a mobile device or a health care wearable device. As another example, the test operation executor 132 may execute the generated test operations to control a robotic manipulator or arm to interact with a mobile device or other device. As a further example, the test operation executor 132 may execute the generated test operations to control simulators that may be used for testing.

At block 316, the test result tracker 134 may track results of the executed test operations. For instance, the test result tracker 134 may track performance of the executed test operations on the identified devices by tracking performance of the scripts and their results. The test result tracker 134 may also take screenshots of the information displayed on the devices as the scripts are being executed. A test management tool may generate information pertaining to the tracked execution of the test operations and the test result tracker 134 may access the generated information. In addition, the test result tracker 134 or an analytics server may analyze the tracked results to determine, for instance, whether the product 140 performed as desired on the devices.

At block 318, the report generator 136 may generate the report 138 of the tracked results. The report generator 136 may generate the report 138 to include information, such as testing metrics, pertaining to an analysis of the tracked results. For instance, the report generator 136 may gather a report object provided by the TestNG and may customize the report object to be in one of a various formats such as HTML, PDF, etc. The report generator 136 may also output the generated report 138 to a test analytics visualization server (not shown), which may provide a representational state transfer (REST) service for storage of the tracked results. In one example, the report generator 136 may cause a unified reporting dashboard with varying testing metrics on testing and defects to be displayed.

As discussed above, the product test orchestration apparatus and methods disclosed herein may be implemented to orchestrate testing on products that may be implemented in a number of different types of industries. The industries may include, for instance, the retail industry (such as an e-commerce website, an online or mobile banking service), the banking industry (such as ATM and online transactions), the healthcare industry, a connected home industry, or the like.

In a first example, the product 140 may include a set of applications to be implemented in an e-commerce retail industry. An example of various roles and actions that may be implemented in an e-commerce retail industry ecosystem is depicted in the diagram 700 in FIG. 7. As shown in the diagram 700, there may be a number of actions and transactions that may occur from the time a user selects the "buy button" on their mobile device, laptop, tablet, etc. According to an example, the product test orchestration apparatus 100 disclosed herein may identify a set of devices upon which a user may access and interact with an e-commerce web site as well as a set of devices on the back-end that provide various transactions with respect to the user's interactions. The sets of devices may include smartphones, tablet computers, laptops, etc., that may run various types of operating systems as discussed above. In addition, the product test orchestration apparatus 100 disclosed herein may identify a set of testing tools for testing the sets of devices with respect to the various actions shown in the diagram 700. As also discussed above, the product test orchestration apparatus 100 disclosed herein may also generate test operations, execute the test operations, track results of the executed test operations, and may generate the report 138 of the tracked results.

Figure 8:
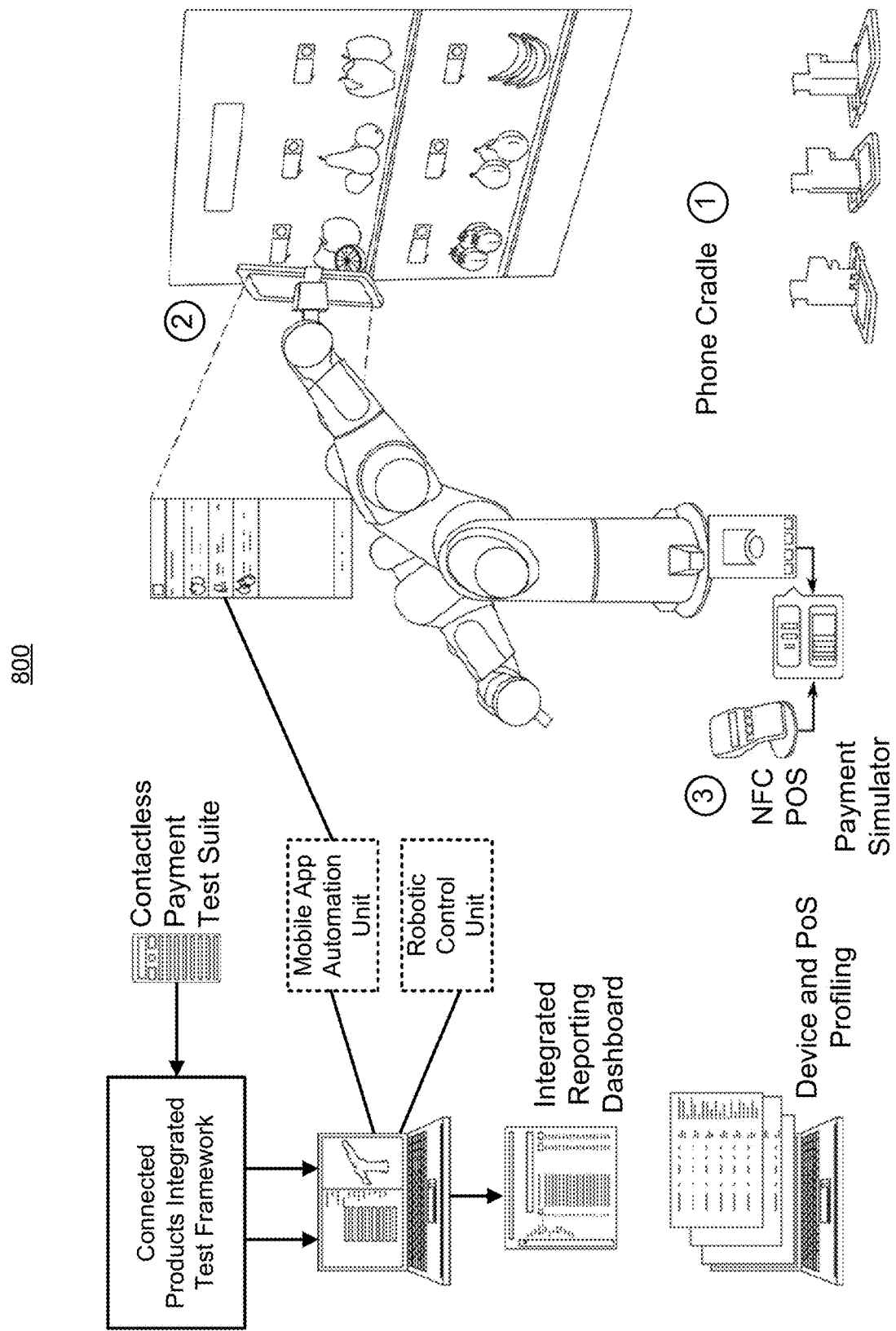

In a second example, the product 140 may include a set of applications to be implemented in a retail and banking industry. An example of various roles and actions that may be implemented in a retail and banking industry ecosystem is depicted in the diagram 800 in FIG. 8. In the diagram 800, following identification of a set of devices on which the product 140 is to be tested and identification of a set of testing tools to be implemented on the identified set of devices, test operations may have been generated in various manners as discussed above with respect to FIGS. 2 and 3. As shown, the set of devices that are to be tested may include smartphones and may be contained in respective cradles. The test operations may include scripts to control a robotic arm (or manipulator) to grab one of the devices under test, to scan an item to be purchased with the device, and to pay for the item at a near field communication point of sale device. The robotic arm may thus be implemented to simulate scanning and payment using a smartphone. The test operations may also include scripts to control operations at the backend of the retail and banking ecosystem, e.g., to ensure that a payment for the item is made.

As discussed above, the product test orchestration apparatus 100 disclosed herein may identify the sets of devices and the set of testing tools, as well as the types of tests to be performed. The product test orchestration apparatus 100 disclosed herein may also generate the test operations, execute the test operations, track results of the executed test operations, and may generate the report 138 of the tracked results.

In a third example, the product 140 may include a set of applications to be implemented in a banking industry. An example of various roles and actions that may be implemented in a banking industry ecosystem by a payee and a payer is depicted in the diagram 900 in FIG. 9. In the diagram 900, following identification of a set of devices on which the product 140 is to be tested and identification of a set of testing tools to be implemented on the identified set of devices, test operations may have been generated in various manners as discussed above with respect to FIGS. 2 and 3. As shown in the diagram 900, there may be a number of actions and transactions that may occur from the time a user downloads a banking app onto their device and logs in.

According to an example, the product test orchestration apparatus 100 disclosed herein may identify a set of devices upon which a user may access and interact with a banking web site as well as a set of devices on the back-end that provide various transactions with respect to the user's interactions. The sets of devices may include smartphones, tablet computers, laptops, etc., that may run various types of operating systems as discussed above. In addition, the product test orchestration apparatus 100 disclosed herein may identify a set of testing tools for testing the sets of devices with respect to the various actions shown in the diagram 900. As also discussed above, the product test orchestration apparatus 100 disclosed herein may also generate test operations, execute the test operations, track results of the executed test operations, and may generate the report 138 of the tracked results.

In a fourth example, the product 140 may include a set of applications to be implemented in a healthcare industry. An example of various operations that may be implemented in a healthcare industry ecosystem is depicted in the diagram 1000 in FIG. 10A. The product test orchestration apparatus 100 disclosed herein may identify a set of devices upon which the various operations may be implemented. As shown in the diagram 1000, the set of devices may include personal health devices, such as a glucose monitor, a pulse oximeter, a wearable device, and an electrocardiograph (ECG) monitor. The product test orchestration apparatus 100 disclosed herein may also identify a set of testing tools for testing the sets of devices with respect to the various actions shown in the diagram 1000. For instance, the product test orchestration apparatus 100 may identify a set of testing tools to simulate the healthcare ecosystem. The simulation may also include operations performed by backend devices.

As also discussed above, the product test orchestration apparatus 100 disclosed herein may also generate test operations, execute the test operations, track results of the executed test operations, and may generate the report 138 of the tracked results.

Figure 10A:
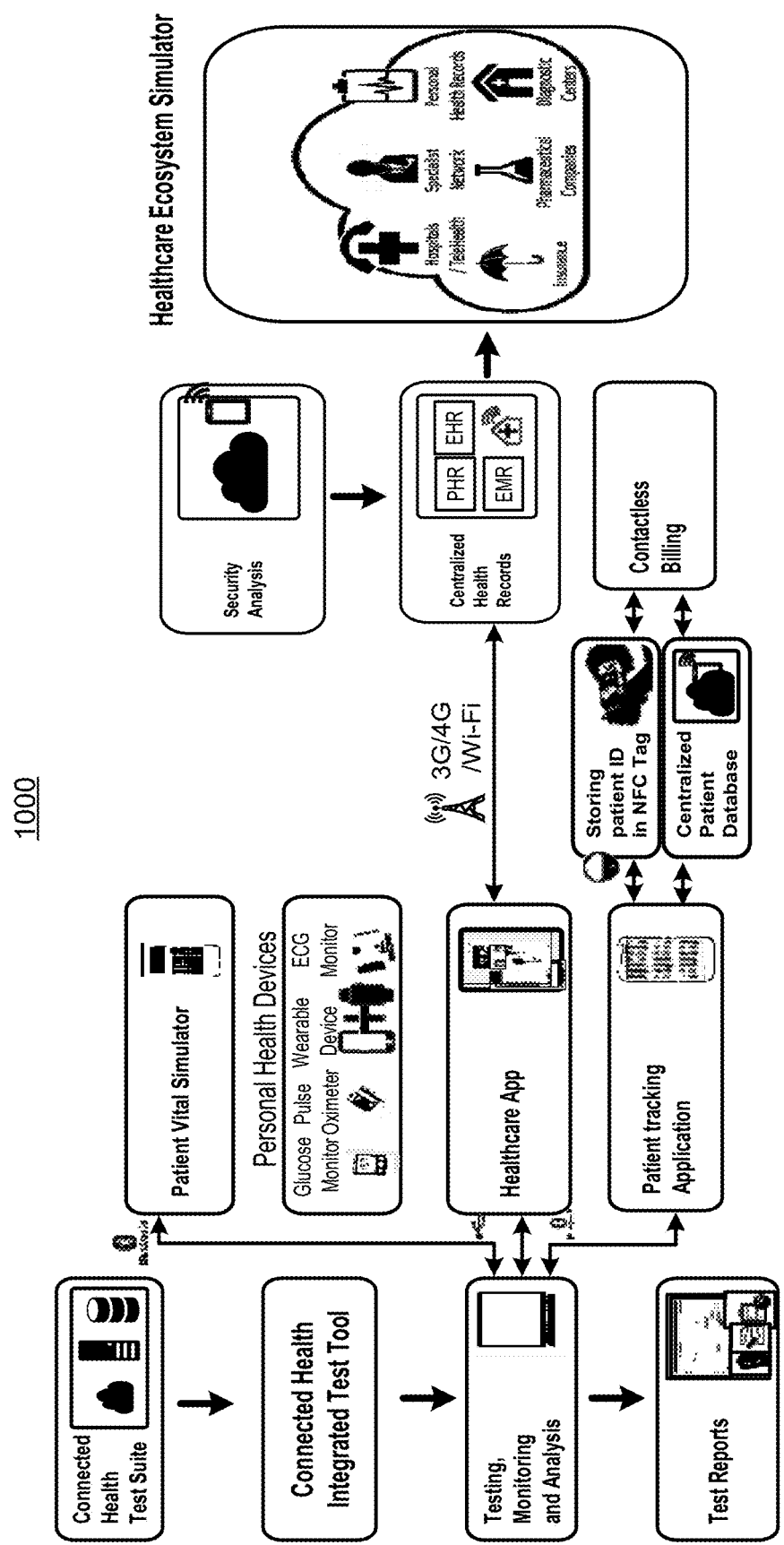

In the healthcare ecosystem example above, various parameters may be tracked, for instance, as shown in the chart 1002 in FIG. 10B. In addition, as shown in the chart 1004 in FIG. 10C, various controllers, such as a robotic arm and a simulator, may be used in testing the product 140 in the healthcare industry ecosystem. For instance, and with reference to the chart 1006 in FIG. 10D, to simulate the detection of the saturation level in a patient's oxygen using a pulse oximeter, the robotic arm may be implemented. That is, the robotic arm may be controlled to interact with the pulse oximeter. However, to simulate a patient's walking or taking steps, the simulator shown in FIG. 10A may be used. In other examples, a wearable tracking device may be used on a patient to detect various physical activity metrics, including walking steps, sleep quality, sleep duration, etc. FIG. 10E shows a chart 1008 depicting various action types for different conditions, in which the action types correspond to the action IDs shown in the chart 1006 in FIG. 10D.

Figure 11:
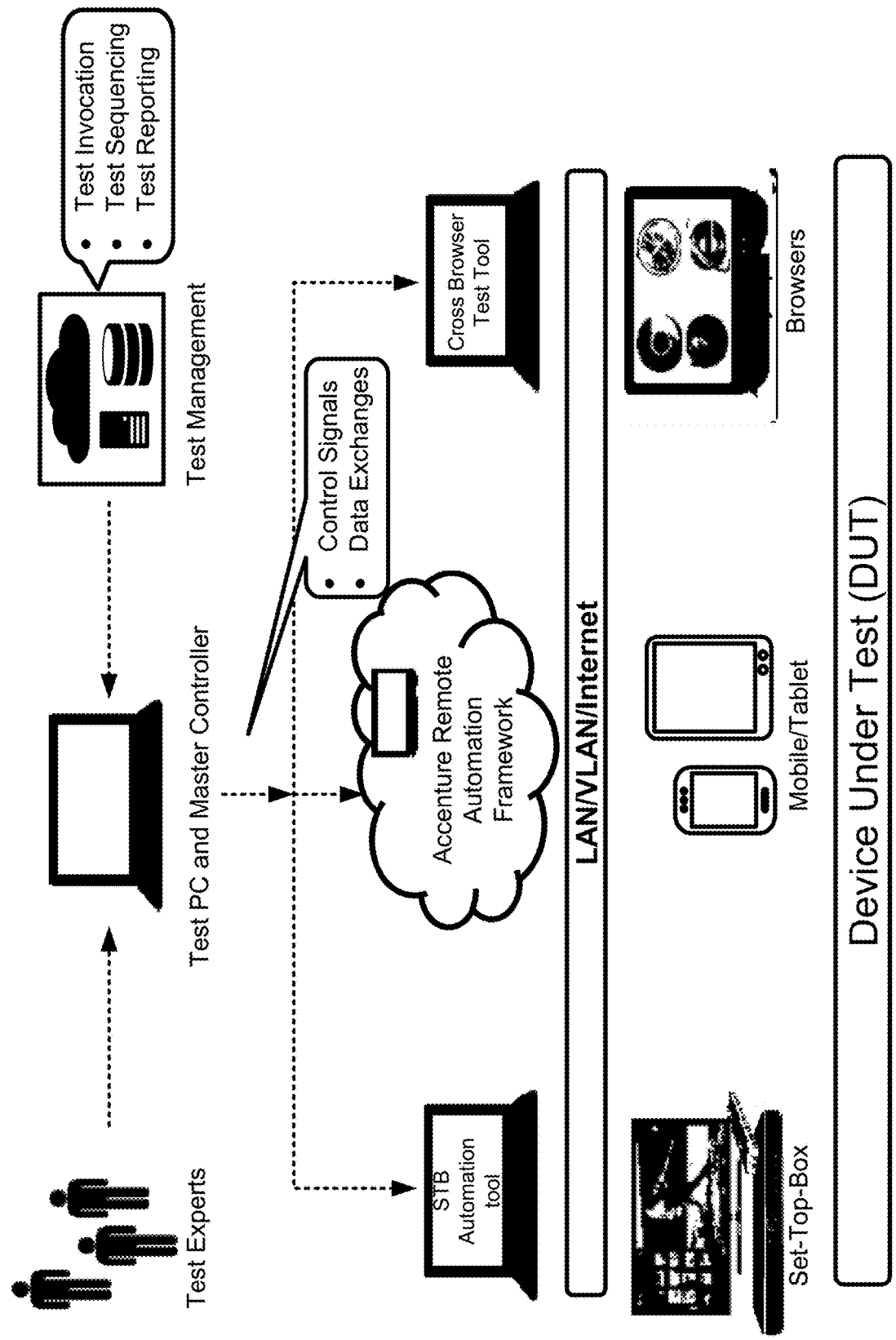

In a fifth example, the product 140 may include a set of applications to be implemented in a connected home industry. An example of various operations that may be implemented in a connected home industry ecosystem is depicted in the diagram 1100 in FIG. 11. As shown in the diagram 1100, the identified set of devices on which the product 140 may tested may include a set-top-box, a mobile device, a tablet device, a laptop computer, as well as different types of browsers that may be accessed via the laptop computer and/or the tablet device. As also shown, the identified set of devices may include backend devices that may run various automation tools to test and track the performance of the product 140 on devices that are under test. In addition, a master controller may manage the testing on the devices under test and may also track results of the test, such as whether the devices under test have passed or failed various ones of the tests. The master controller may also generate the report 138 of the tracked results. The master controller shown in FIG. 11 may thus be similar to the product test orchestration apparatus 100.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A product test orchestration apparatus comprising:
a processor; and
a non-transitory computer readable medium storing instructions that when executed by the processor cause the processor to:
access user-defined information of a product to be tested;
identify, based upon the accessed user-defined information, a set of devices on which the product is to be tested;
identify, based upon the accessed user-defined information and a plurality of key performance indicators (KPIs), a set of testing tools to be implemented on the identified set of devices to test the product;
write a respective test automation script to control each of the identified set of devices, wherein each of the respective test automation scripts to control each of the identified set of devices includes testing how the product operates on the identified set of devices and across different types of industries;
generate, utilizing each of the respective test automation scripts to control each of the identified set of devices, test operations for the identified set of testing tools to be implemented on the identified set of devices;
execute the generated test operations on the identified set of devices, including:
implementing an adapter to provide a custom application programming interface (API) and to parameterize use of one or more custom API scripts;
applying an adapter customization during execution of the generated test operations; and
designing scenarios from scanned automation test scripts, a test step model and extracted parameters, including utilizing a customized adapter to execute a written script during execution of the designed scenarios;

export the generated test operations for scenario formation, including scanning an archive file and the generated test operations for available test steps and parameterizing the available test steps utilizing parameters associated with the generated test operations;

track results of the executed test operations, including tracking performance and results of each of the respective test automation scripts to control each of the identified set of devices;

determine whether the product performed as desired based on the tracked results; and generate a report of the tracked results.

2. The product test orchestration apparatus according to claim 1, Wherein each of the respective test automation scripts to control each of the identified set of devices is to implement the identified set of testing tools.

3. The product test orchestration apparatus according to claim 1, wherein to generate test operations for the identified set of testing tools, the instructions are further to cause the processor to:

provide a series of questions to list the identified set of devices and the identified set of testing tools to be selected.

4. The product test orchestration apparatus according to claim 1, wherein to identify the set of devices, the instructions are further to cause the processor to:

identify a group of devices that matches criteria in the user-identified information;

determine, for each device in the identified group of devices, data pertaining to each device, comprising at least one of market share, popularity based on region, country in which the product is to be used, product type, and connectivity type for the product; and identify the set of devices from the identified group of devices based upon the data pertaining to each device.

5. The product test orchestration apparatus according to claim 1, wherein to identify the set of testing tools, the instructions are further to cause the processor to:

identify the set of testing tools from a database storing information on a group of previously evaluated testing tools.

6. The product test orchestration apparatus according to claim 1, wherein the instructions are further to cause the processor to:

execute each of the respective test automation scripts to control each of the identified set of devices to execute the generated test operations.

7. The product test orchestration apparatus according to claim 1, wherein the instructions are further to cause the processor to:

generate a system model; and wherein to generate test operations for the identified set of testing tools, the instructions are further to cause the processor to:

use the generated system model to generate the test operations.

8. The product test orchestration apparatus according to claim 1, further comprising:

a robotic manipulator, wherein the instructions are further to cause the processor to:

control the robotic manipulator to interact with at least one device of the identified set of devices according to a generated test operation to execute the generated test operations.

9. The product test orchestration apparatus according to claim 1, wherein the generated test operations are to simulate actions that the product is to perform on the identified set of devices.

10. The product test orchestration apparatus according to claim 1, wherein the identified set of devices comprises at least one of a mobile device, a user-wearable device, a laptop computer, and a server computer.

11. The product test orchestration apparatus according to claim 1, wherein the accessed user-defined information includes information pertaining to an industry in which the product is to be employed, and wherein the processor is to identify the identified set of devices and the identified set of testing tools that correspond to an ecosystem of the industry in which the product is to be employed.

12. A computer-implemented method for orchestrating a product test, the method comprising:

accessing, by a processor, user-defined information regarding a computer-implemented product to be tested;

identifying, by the processor and based upon the accessed user-defined information, a set of devices on which the computer-implemented product is to be tested;

identifying, by the processor and based upon the accessed user-defined information and a plurality of key performance indicators (KPIs), a set of testing took to be implemented on the identified set of devices to test the computer-implemented product;

writing a respective test automation script to control each of the identified set of devices, wherein each of the respective test automation scripts to control each of the identified set of devices includes testing how the computer-implemented product operates on the identified set of devices and across different types of industries;

generating, by the processor and utilizing each of the respective test automation scripts to control each of the identified set of devices, test operations for the identified set of testing tools to be implemented on the identified set of devices;

executing, by the processor, the generated test operations on the identified set of devices, wherein executing the generated test operations includes:

implementing an adapter to provide a custom application programming interface (API) and to parameterize use of a customized API script;

applying an adapter customization during execution of the generated test operations; and designing scenarios from scanned automation test scripts, a test step model and extracted parameters, including utilizing a customized adapter to execute a written script during execution of the designed scenarios;

exporting the generated test operations for scenario formation, including scanning an archive file and the generated test operations for available test steps and parameterizing the available test steps utilizing parameters associated with the generated test operations; and tracking results of the executed test operations, including tracking performance and results of each of the respective test automation scripts to control each of the identified set of devices.

13. The method according to claim 12, wherein the parameterized API script is configured to grab screenshots to be saved during execution of the generated test operations.

14. The method according to claim 12, wherein the generating test operations for the identified set of testing tools includes providing a series of questions to list the identified set of devices and the identified set of testing tools to be selected.

15. The method according to claim 12, further comprising:
synchronizing a designed test scenario, an automation test script and execution results with a test management tool.

16. The method according to claim 12, further comprising:
calculating, by the processor, market coverage of a group of devices that matches parameters in the accessed user-defined information, and wherein identifying the set of devices further comprises identifying the set of devices from the group of devices having relatively high market coverage.

17. The method according to claim 12, wherein executing the generated test operations further comprises executing each of the respective test automation scripts.

18. A non-transitory computer readable medium storing instructions that when executed by a processor cause the processor to:
scan automation test scripts for a set of identified devices and a set of identified testing tools, wherein the set of identified devices is identified based upon accessed user-defined information and the set of identified testing tools is identified based on the accessed user-defined information and a plurality of key performance indicators (KPIs);
write a respective test automation script to control each of the set of identified devices, wherein each of the respective test automation scripts to control each of the set of identified devices tests how a product operates on the set of identified devices and across different types of industries;
generate test operations for the set of identified testing tools to be implemented on the set of identified devices;
execute generated test operations on the identified set of devices, including:
implementing an adapter to provide a custom application programming interface (API) and to parameterize use of one or more custom API scripts;
applying an adapter customization during execution of the generated test operations; and
designing scenarios from scanned automation test scripts, a test step model and extracted parameters, including utilizing a customized adapter to execute a written script during execution of the designed scenarios;
export the generated test operations for scenario formation, including scanning an archive file and the generated test operations for available test steps and parameterizing the available test steps utilizing parameters associated with the generated test operations;
extract parameters for customization via a modular graphical user interface;
design a test scenario from the scanned automation test scripts and the extracted parameters, wherein the designed test scenario incudes a plurality of test cases, and the plurality of test cases each include a plurality of test steps customized based on one or more of the extracted parameters;
execute the designed test scenario;
track results of the executed test operations, including tracking performance and results of each of the respective test automation scripts for each of the identified set of devices; and
determine whether the product performed as desired based on tracked results.

19. The non-transitory computer readable medium according to claim 18, wherein the instructions are further to cause the processor to:
present a scanned test step model to a user via a user interface; and
receive a user selection of a required step to include in the designed test scenario.

20. The non-transitory computer readable medium according to claim 19, wherein the instructions are further to cause the processor to:
synchronize the designed test scenario, the scanned automation test scripts and execution results with a test management tool.

* * * * *

UNITED STATES PATENT AND TRADEMARK OFFICE
CERTIFICATE OF CORRECTION

PATENT NO. : 11,308,504 B2
APPLICATION NO. : 16/863720
DATED : April 19, 2022
INVENTOR(S) : Vijaya Krishna BS et al.

It is certified that error appears in the above-identified patent and that said Letters Patent is hereby corrected as shown below:

In the Claims

At Claim 2, Column 19, Line 15 from the top, the word "Wherein" should instead read "wherein"

At Claim 12, Column 20, Line 27 from the top, the phrase "testing took" should instead read "testing tools"

At Claim 18, Column 22, Line 27 from the top, the phrase "based on tracked" should instead read "based on the tracked"

Signed and Sealed this
Fourteenth Day of February, 2023

Katherine Kelly Vidal
*Director of the United States Patent and Trademark Office*